United States Patent [19]

Thatcher

[11] Patent Number: 4,575,361
[45] Date of Patent: Mar. 11, 1986

[54] UNIVERSAL JOINT YOKE

[75] Inventor: David L. Thatcher, Douglassville, Pa.

[73] Assignee: Dana Corporation, Toledo, Ohio

[21] Appl. No.: 689,231

[22] Filed: Jan. 7, 1985

[51] Int. Cl.[4] .............................................. F16D 3/26
[52] U.S. Cl. .................................. 464/135; 29/527.6; 403/57
[58] Field of Search ........................ 29/527.6; 403/57; 464/130, 134, 135

[56] References Cited

U.S. PATENT DOCUMENTS

| | | | |
|---|---|---|---|
| 1,853,300 | 4/1932 | Cutting | 464/130 |
| 2,036,977 | 4/1936 | Anderson | 464/130 |
| 2,161,234 | 6/1939 | Padgett | 464/130 |
| 2,171,313 | 8/1939 | Pearce | 464/130 |
| 2,253,300 | 8/1941 | Karlberg | 464/130 |
| 2,273,920 | 2/1942 | Anderson | 464/130 |
| 2,291,436 | 7/1942 | Anderson | 464/135 X |
| 2,299,001 | 10/1942 | Anderson | 464/130 |
| 2,770,114 | 11/1956 | Slaght | 464/130 |
| 3,783,638 | 1/1974 | Doran et al. | 464/130 |

FOREIGN PATENT DOCUMENTS

| | | | |
|---|---|---|---|
| 222769 | 8/1958 | Australia | 464/130 |
| 2125935 | 3/1984 | United Kingdom | 464/134 |

Primary Examiner—John M. Jillions
Assistant Examiner—Daniel P. Stodola
Attorney, Agent, or Firm—Robert H. Johnson; Robert M. Leonardi

[57] ABSTRACT

A cast or forged universal joint yoke having a hub from which extend a pair of arms in spaced apart parallel relation. Each arm as a generally U-shaped bearing cup receiving recess, each recess including a pair of arcuate bearing cup surfaces along the sides thereof. A depression is located in the bight portion of the recess and an integral bearing cup positioning and retaining lug protrudes from the depression. The depression extends on each side of the lug between the lug and adjacent support surfaces so that there is no radius or transition of material between the lug and the supporting surfaces.

8 Claims, 6 Drawing Figures

UNIVERSAL JOINT YOKE

BACKGROUND OF THE INVENTION

This invention relates to universal joints, and more specifically to cast or forged universal joint yokes having bearing cup support surfaces which are broached to a finished configuration and location.

It is known to use a broaching operation to bring the bearing cup support surfaces in a cast or forged universal joint yoke to a finished configuration and location. Prior yoke designs which include integral bearing cup positioning and retaining lugs have had material between the lugs and adjacent bearing support surfaces which it is necessary to remove during the broaching operation along with the material that must be removed to bring the support surfaces to a finished configuration and location. The material between the lugs and adjacent support surfaces provide a configuration in conjunction with the support surfaces such that the successive cuts made by the broach must be of non-uniform depth and, in part, substantial depth. This has two undesirable results.

First, this causes chatter of the broach during the broaching operation and thereby dulls the broach more quickly than would be the case if there was no broach chatter. Obviously, broach life is shortened and the speed of production is decreased due to increased down-time for replacing or sharpening the broach. The result is that production costs are higher than would be the case if broach chatter was not present.

Second, this causes the arms of the yoke to be bent slightly during the broaching operation because of the increased force exerted due to the substantial depth over part of the cut. Consequently, the bearing cup support surfaces are finished so that the bearing cups are held with their axes slightly non-coaxial. Such misalignment has the undesirable effect of greatly reducing the life of the bearings held in the yoke.

My improved universal joint yoke overcomes both of the problems described above by providing a design which eliminates the material between the lug and adjacent bearing cup support surfaces so that the broach can make successive cuts which are substantially uniform and are not substantial in depth. As a result, broach chatter and bending of the yoke arms during broaching are eliminated.

BRIEF SUMMARY OF THE INVENTION

This invention relates to a cast or forged universal joint yoke. The yoke includes a pair of arms, each having a generally U-shaped bearing cup receiving recess. Each recess includes a pair of arcuate bearing cup support surfaces along the sides thereof, a depression in the bight portion of the recess and an integral bearing cup positioning and retaining lug which protrudes from the depression. The depression extends on each side of the lug between the lug and adjacent support surfaces so that there is no radius of material between the lug and the supporting surfaces.

It is a principal object of my invention to provide an improved cast or forged universal joint yoke which eliminates broach chatter and yoke arm bending during the broaching operation.

The above and other objects, features and advantages of my invention will become apparent upon consideration of the detailed description and appended drawing.

DETAILED DESCRIPTION OF THE PREFERRED EMBODIMENT

Figure 1:
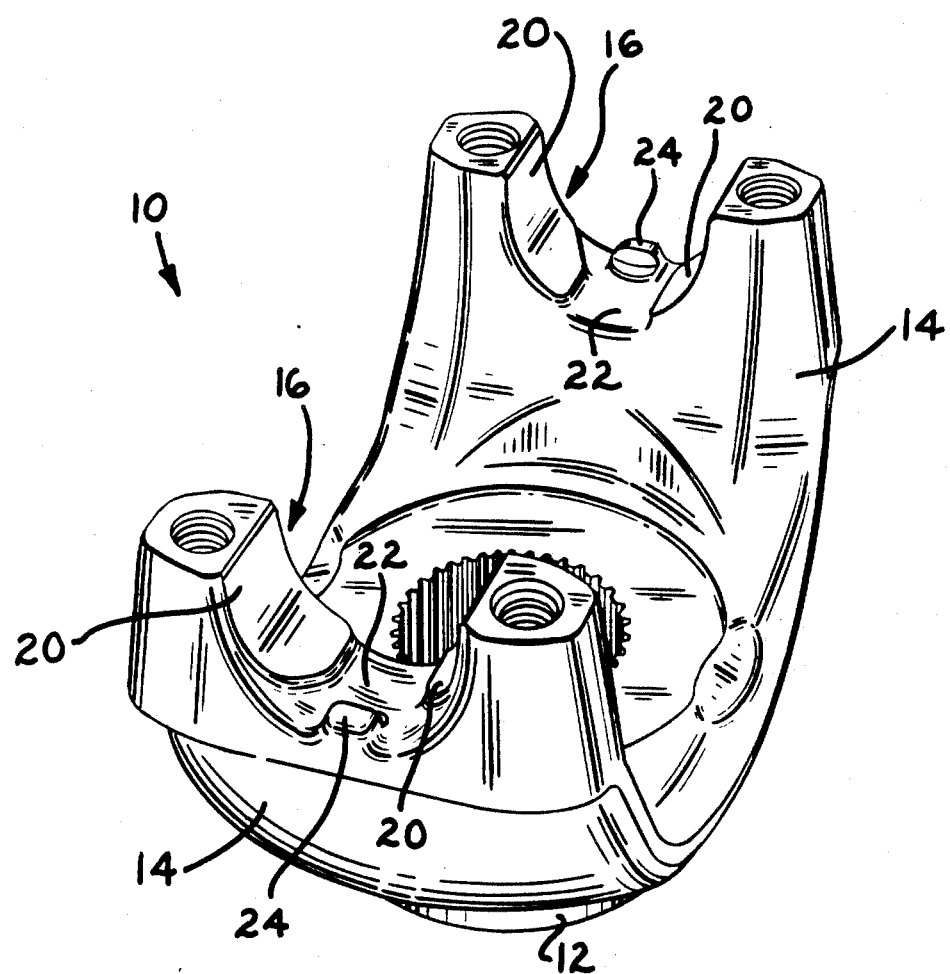
FIG. 1 is a perspective view of a universal joint yoke embodying my invention.
Figure 2:
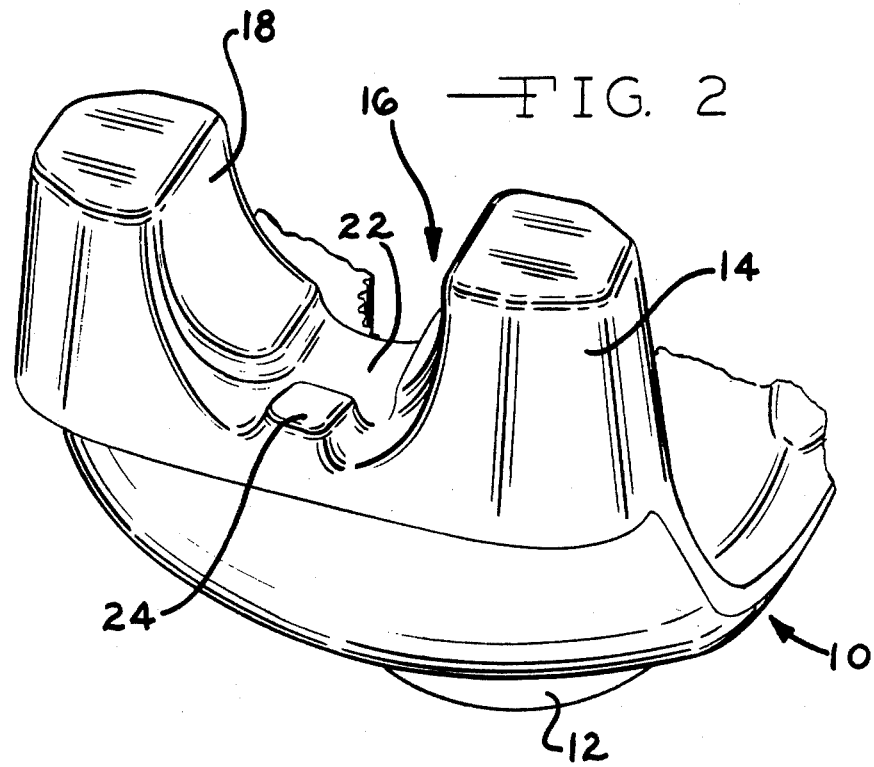
FIG. 2 is an enlarged perspective view of one arm of the yoke in FIG. 1 prior to broaching.

Referring to FIGS. 1 through 4, reference numeral 10 denotes a cast or forged universal joint yoke which has a hub 12 from which a pair of arms 14 extend in spaced apart, parallel relationship.

Each arm 14 includes a generally U-shaped bearing cup receiving recess 16. Recess 16 includes a pair of sides 18 (see FIGS. 2 and 3) which after broaching provide a pair of arcuate bearing cup support surfaces 20. Located in the bight portion of recess 16 is a depression 22 which extends entirely across recess 16. Protruding from depression 22 is a lug 24 which serves to position and retain a bearing cup disposed in recess 16. It will be noted that depression 22 extends on each side of lug 24 between lug 24 and the adjacent sides 18 or arcuate bearing cup support surfaces 20.

Figure 3:
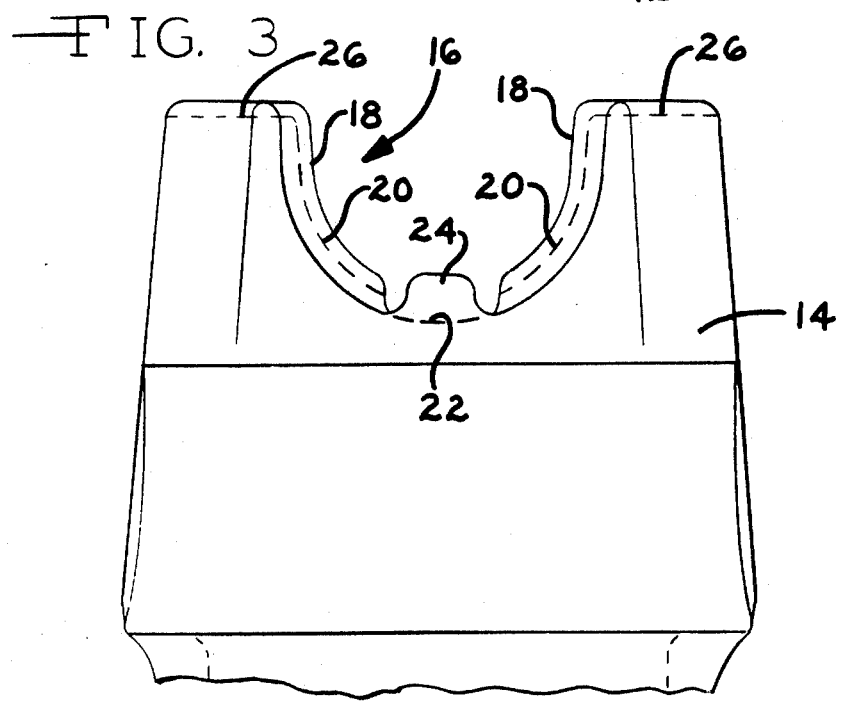
FIG. 3 is a fragmentary end view of the arm shown in FIG. 2.
Figure 4:
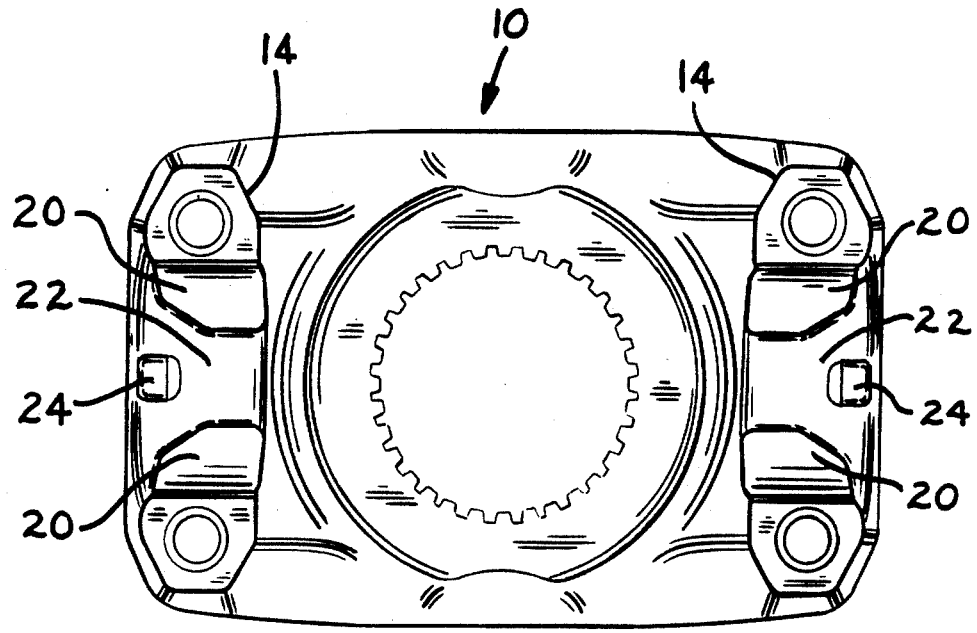
FIG. 4 is a plan view of the yoke shown in FIG. 1.

In order to bring support surfaces 20 to a finished configuration and location, a broach is run through recesses 16. As best illustrated in FIG. 3, the broach removes excess material from each arm 14 to provide a finished configuration indicated by cutting line 26 and arcuate support surfaces 20. Because depression 22 extends on each side of lug 24, there is no transition of material between lug 24 and sides 18 or arcuate support surfaces 20 (see FIG. 3) so that when yoke 10 is broached to provide support surfaces 20 with a finished configuration and location, the material removed from yoke 10 can be removed by successive cuts which are substantially uniform and shallow in depth.

Figure 5:
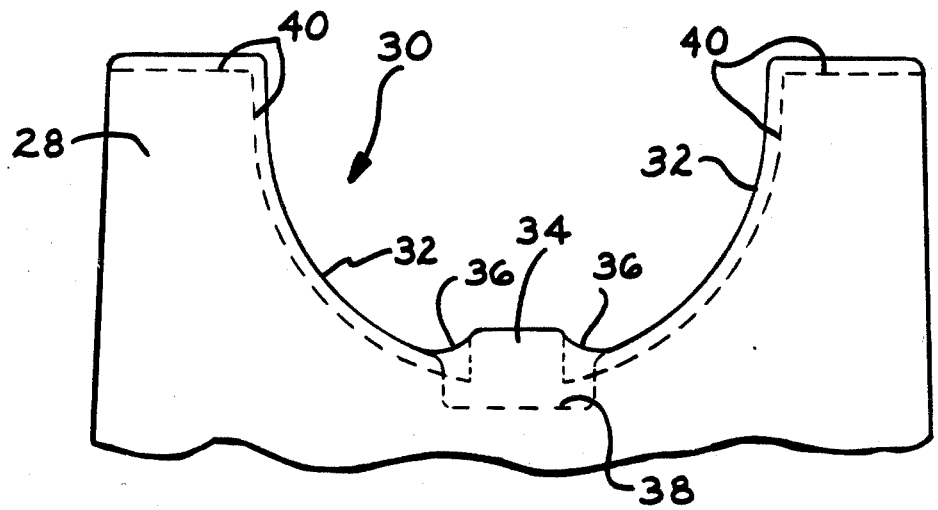
FIG. 5 is an end view similar to FIG. 3 of the arm of a prior art yoke.
Figure 6:
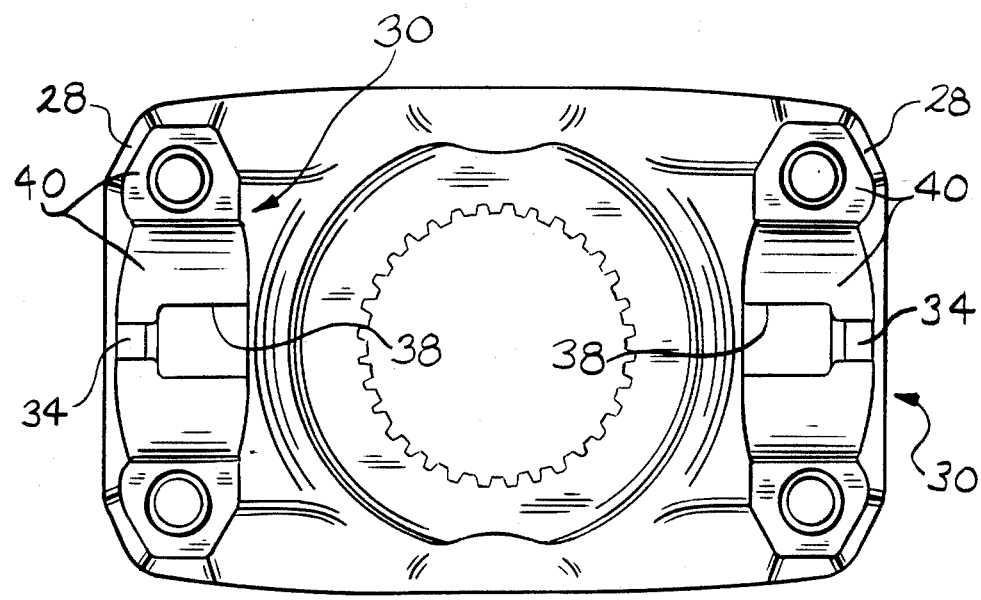
FIG. 6 is a plan view similar to FIG. 4 of a prior art yoke.

On the other hand, in the prior art yoke constructions shown in FIGS. 5 and 6, each yoke arm 28 includes a recess 30 having sides 32 which run into a lug 34 by way of a radius or transition of material 36. Arm 28 also is provided with a depression 38 adjacent to lug 34. As will be apparent from viewing FIG. 5, when the yoke is broached to a configuration indicated by cutting line 40, the cuts that must be made by the broach will be non-uniform and, in the area of radius 36, a substantial amount of material will have to removed. As a result there will be broach chatter and a bending of arm 28 so that the bearing cup axes will be non-coaxial.

Although the structural change which I have made over the prior art to produce yoke 10 is small, the problems solved were substantial and long standing. By extending the depression in the bight portion of the yoke arm on each side of the bearing cup positioning and retaining lug and thereby eliminating any radius or transition of material between the lug and adjacent support surfaces, it has been possible to elimate broach chatter with its attendant increase in production costs due to downtime for broach sharpening or replacement and decreased tool life. Also, bearing life is increased due to eliminating bending of the arms during broaching which is a cause of misalignment of the axes of adjacent bearings.

My invention is subject to various changes and modifications without departing from the scope of the appended claims, so the limits of my invention should be determined from reference to the claims when viewed in light of the prior art.

I claim:

1. In a universal joint yoke rotatable about a yoke axis, said yoke having a hub, a pair of spaced and parallel arms extending from said hub in the direction of said yoke axis, each arm including a generally U-shaped bearing cup receiving recess, said recesses being aligned on a bearing cup axis transverse to said yoke axis, and an integral bearing cup positioning and retaining lug extending from said recess, an improvement wherein each of said recesses comprise a pair of circumferentially extending bearing cup support surfaces, and wherein each of said recesses further comprise a circumferential gap between each of said bearing cup support surfaces and the respective bearing cup positioning and retaining lug, whereby a broach can be moved axially through the generally U-shaped bearing cup receiving recess to machine the bearing cup support surfaces while simultaneously avoiding material which defines said positioning and retaining lugs.

2. A universal joint yoke as defined in claim 1 wherein said yoke is comprised of cast iron.

3. A universal joint yoke as defined in claim 1 wherein said yoke is comprised of forged steel.

4. A universal joint yoke as defined in claim 1, wherein at least a portion of each of said positioning and retaining lugs is positioned axially outwardly along said bearing cup axis of said respective bearing cup support surfaces.

5. A universal joint yoke rotatable about a yoke axis, said yoke comprising a hub, a pair of arms extending from said hub in spaced apart, parallel relation, each arm including a generally U-shaped bearing cup receiving recess, said recesses being aligned on a bearing cup axis transverse to said yoke axis, each recess having a pair of arcuate bearing cup support surfaces circumferentially spaced relative to said bearing cup axis, a depression in each recess which extends in the direction of said bearing cup axis completely across the recess, and an integral bearing cup positioning and retaining lug which protrudes in the direction of said yoke axis from the bight portion of each depression, whereby said bearing cup positioning and retaining lug is spaced apart from said bearing cup support surfaces.

6. A universal joint yoke as defined in claim 5 wherein said yoke is comprised of cast iron.

7. A universal joint yoke as defined in claim 5 wherein said yoke is comprised of forged steel.

8. A universal joint yoke as defined in claim 5 wherein at least a portion of each of said positioning and retaining lugs is positioned axially outwardly along said bearing cup axis of said respective bearing cup support surfaces.

* * * * *